Dec. 10, 1940.  C. DORNIER  2,224,571
RETRACTABLE ELEMENT FOR AIRCRAFT
Filed June 5, 1939
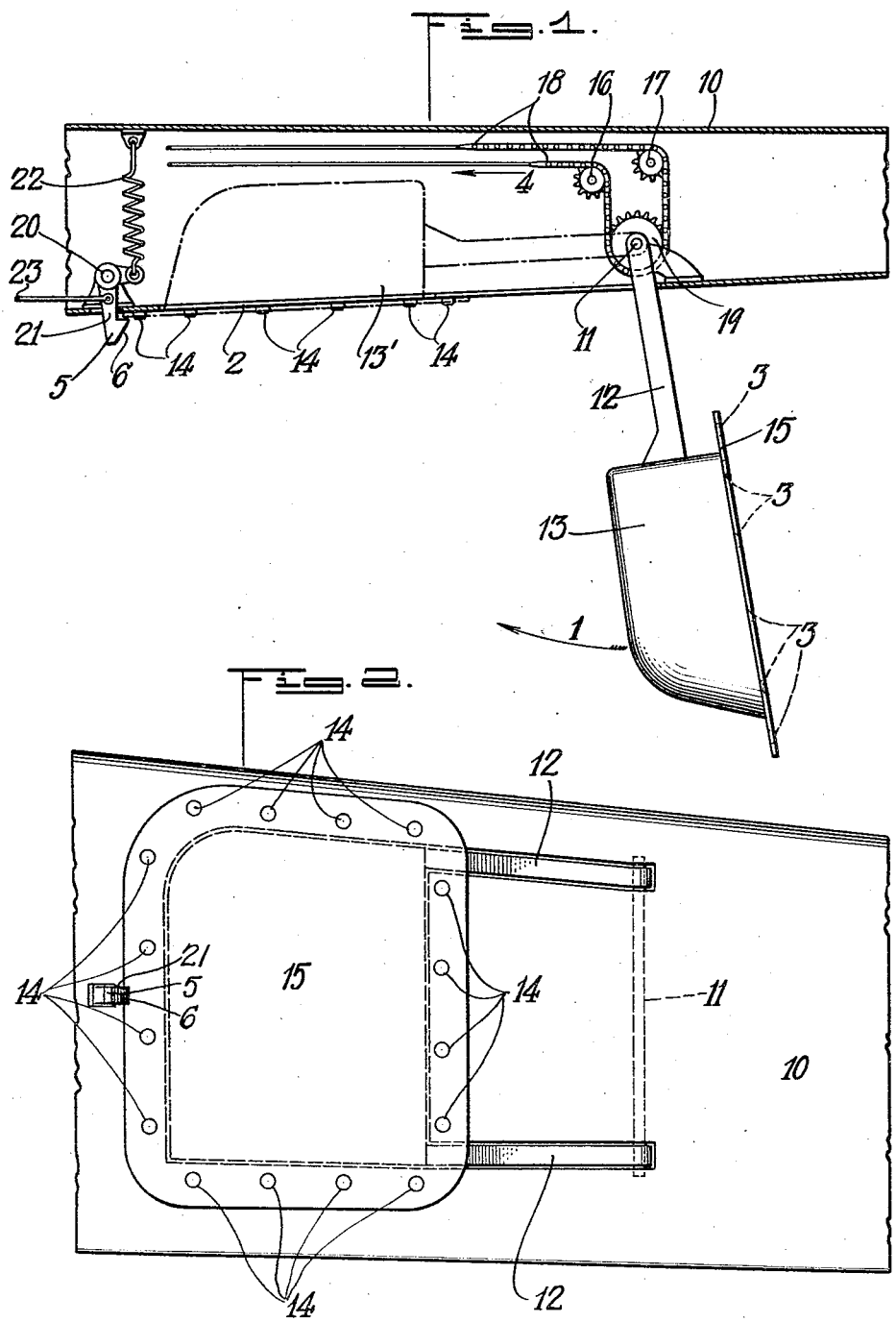
INVENTOR.
CLAUDE DORNIER.
BY
Karl A. Mayr
ATTORNEY.

Patented Dec. 10, 1940

2,224,571

UNITED STATES PATENT OFFICE 2,224,571

RETRACTABLE ELEMENT FOR AIRCRAFT

Claude Dornier, Friedrichshafen-on-the-Bodensee, Germany, assignor of one-half to Dornier-Werke G. m. b. H., Friedrichshafen-on-the-Bodensee, Germany Application June 5, 1939, Serial No. 277,434
In Germany June 13, 1938

6 Claims. (Cl. 244—102)

The present invention relates to an aircraft having retractable elements such as an undercarriage, or floats or stumps for temporarily increasing buoyancy which can be retracted into a body of the aircraft such as the fuselage or the wings of an aeroplane, more particularly to an aircraft of the type set forth in which said elements, when retracted, are adapted to make up for the stability lost by the provision of an opening and cavity in the aircraft body for receiving said elements.

The provision of cavities in the bodies of aircraft and openings in the surface of said bodies for providing space for retracting elements of the type set forth above weakens the structure of said bodies. Special provisions must be made to make up for the weakening effect of the cavities and these provisions increase the weight of the aircraft. Particularly when the cavities are located in the bottom side of the wings of an aeroplane the cross section of the wing adjacent to the cavity is much reduced and the structure must be built around the cavity and through a reduced space. This necessitates a much heavier construction than is necessary when the bottom side of the wing is not interrupted by an opening and cavity.

It is an object of the present invention to construct the retractable parts in such a manner that these parts bridge the openings in the body surface when retracted and provide the desired stability themselves. The adjacent parts of the body surface or the framework of the body and of the retractable elements, according to the present invention, are provided with joining means which rigidly interconnect said parts and whereby the cavity or opening is bridged in a stabilizing manner by means of said retractable elements.

The construction according to the present invention is not anticipated by constructions in which the stays of the undercarriage serve as wing struts to the wings into which said undercarriage is retracted.

It is a further object of the present invention to provide retractable elements of the type set forth which are automatically locked into retracted position and which cannot be protracted unless they are unlocked prior to the protracting operation.

Further and other objects and advantages of the present invention will be apparent from the accompanying specification and claims and shown in the drawing which, by way of illustration, show what I now consider to be a preferred embodiment of my invention.

In the drawing:

Figure 1 is a part sectional view of a retractable float and wing structure according to the present invention.

Figure 2 is a bottom view of the structure shown in Figure 1 with the float in retracted position.

Like parts are designated by like numerals in both figures of the drawing.

The float 13 is mounted to the stays 12 which are fulcrumed at 11 to the wing 10. Float 13 can be swung about 90° in the direction of arrow 1 into the position 13' shown in dash and dotted lines. Studs 14 are provided around the opening 2 of the bottom surface of wing 10 into which opening the float 13 can be retracted. Float 13 is provided with a plate or surface member 15 the rim of which is provided with openings 3 which correspond to the bolts 14. The axle 11 of the float element 12, 13 is provided with a sprocket wheel 19; two more sprocket wheels 16 and 17 are provided in the interior of wing 10. A chain 18 is laid around said sprocket wheels so that by pulling the chain in the direction of arrow 4 the float is retracted into position 13'. When fully retracted the studs 14 register with holes 3 and assure a rigid connection of the bottom surface of wing 10 and the plate 15 of float 13. Upon pulling chain 18 in a direction opposite to arrow 4 plate 15 is disengaged from bolts 14.

Provisions are made to prevent undesired disengagement of float and wing, for example, due to vibrations. A lock for this purpose is shown in Figure 1. It comprises a bell-crank lever 21 swingable about fulcrum 20; one arm of lever 21 is connected to one end of a spring 22 the other end of which is connected with the wing 10; the other arm of lever 21 is provided with a hook 5 which engages plate 15 when it is in retracted position. Spring 22 assures engagement of hook 5 and plate 15. As long as lever 21 is in the position shown, disengagement of plate 15 from wing 10 and breaking up of the static bridge materialized by plate 15 and bolts 14 is not possible. If latch 21 is disengaged from plate 15 by pulling member 23 which is connected to the hook arm of lever 21 float 13 can be protracted. When float 13 is retracted engagement of latch 21 takes place automatically because the edge of plate 15 forces latch 21 to move temporarily in clockwise direction; a slanted surface 6 is provided for this purpose on hook 5.

While I believe the above described embodiments of my invention to be preferred embodiments, I wish it to be understood that I do not desire to be limited to the exact details of design and construction shown and described, for obvious modifications will occur to a person skilled in the art.

I claim:

1. In an aircraft a body comprising a surface member having a border portion surrounding an opening in said member, a float element fitting into the opening of said surface member and being movably connected with said body for protraction and retraction with respect thereto, said element also having a surface member so constructed as to completely close the opening in said first mentioned surface member and having a border portion abutting said first mentioned border portion, both said border portions being provided with a plurality of corresponding cooperating connecting means adapted to rigidly interconnect said border portions so that both said surface members form a rigid and stable surface unit when said element is in retracted position.

2. In an aircraft a body comprising a surface member having a border portion surrounding an opening in said member, a float element fitting into the opening of said surface member and being movably connected with said body for protraction and retraction with respect thereto, said element also having a surface member fitting over and so constructed as to completely close the opening in said first mentioned surface member and having a border portion conforming with and overlapping and abutting said first mentioned border portion, both said border portions being provided with a plurality of corresponding cooperating connecting means adapted to rigidly interconnect said border portions so that both said surface members form a rigid and stable surface unit when said element is in retracted position.

3. In an aircraft a body comprising a surface member having a border portion surrounding an opening in said member, a float element fitting into the opening of said surface member and being movably connected with said body for protraction and retraction with respect thereto, said element also having a surface member fitting over and so constructed as to completely close the opening in said first mentioned surface member and having a border portion conforming with and overlapping and abutting said first mentioned border portion, a plurality of knob-like projections connected with said first mentioned border portion and fitting into a plurality of corresponding openings provided in said second border portion and adapted to rigidly interconnect said border portions so that both said surface members form a rigid and stable surface unit when said element is in retracted position.

4. In an aircraft a body comprising a surface member having a border portion surrounding an opening in said member, a float element fitting into the opening of said surface member and being movably connected with said body for protraction and retraction with respect thereto, said element also having a surface member fitting over and so constructed as to completely close the opening in said first mentioned surface member and having a border portion conforming with and overlapping and abutting said first mentioned border portion, a plurality of knob-like projections connected with and distributed over the whole of said first mentioned border portion and fitting into a plurality of corresponding openings provided in and distributed over the whole of said second border portion and adapted to rigidly interconnect said border portions so that both said surface members form a rigid and stable surface unit when said element is in retracted position.

5. In an aircraft a body comprising a surface member having a border portion surrounding an opening in said member, a float element fitting into the opening of said surface member and being movably connected with said body for protraction and retraction with respect thereto, said element also having a surface member so constructed as to completely close the opening in said first mentioned surface member and having a border portion abutting said first mentioned border portion, both said border portions being provided with a plurality of corresponding cooperating connecting means adapted to rigidly interconnect said border portions so that both said surface members form a rigid and stable surface unit when said element is in retracted position, and an automatically acting latch means connected with said body and adapted to engage said element and firmly holding it in retracted position.

6. In an aircraft a body comprising a surface member having a border portion surrounding an opening in said member, a float element fitting into the opening of said surface member and being movably connected with said body for protraction and retraction with respect thereto, said element also having a surface member so constructed as to completely close the opening in said first mentioned surface member and having a border portion abutting said first mentioned border portion, both said border portions being provided with a plurality of corresponding cooperating connecting means adapted to rigidly interconnect said border portions so that both said surface members form a rigid and stable surface unit when said element is in retracted position, and an automatically acting latch means connected with said body and adapted to engage said second border portion and firmly holding said element in retracted position.

CLAUDE DORNIER